United States Patent
Ward (10) Patent No.: US 9,665,881 B1
(45) Date of Patent: May 30, 2017

(54) PHYSICAL STORE ONLINE SHOPPING CONTROL

(75) Inventor: Miles J. Ward, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 241 days.

(21) Appl. No.: 13/464,602

(22) Filed: May 4, 2012

(51) Int. Cl.
*G06Q 30/02* (2012.01)

(52) U.S. Cl.
CPC .................................. *G06Q 30/0239* (2013.01)

(58) Field of Classification Search
None
See application file for complete search history.

(56) References Cited

U.S. PATENT DOCUMENTS

| | | | | | |
|---|---|---|---|---|---|
| 5,950,173 | A * | 9/1999 | Perkowski | ............ | G06Q 30/02 235/375 |
| 6,557,054 | B2 * | 4/2003 | Reisman | ....................... | 709/206 |
| 6,594,692 | B1 * | 7/2003 | Reisman | ................... | G06F 8/65 705/26.1 |
| 6,611,862 | B2 * | 8/2003 | Reisman | ................... | G06F 8/65 705/1.1 |
| 6,625,581 | B1 * | 9/2003 | Perkowski | ........ | G06F 17/30879 705/14.34 |
| 6,658,464 | B2 * | 12/2003 | Reisman | ......................... | 705/31 |
| 6,769,009 | B1 * | 7/2004 | Reisman | ................... | G06F 8/65 705/27.1 |
| 6,837,436 | B2 * | 1/2005 | Swartz et al. | ........... | 235/472.02 |
| 6,959,286 | B2 * | 10/2005 | Perkowski | ............ | G06Q 30/02 705/26.62 |
| 6,961,712 | B1 * | 11/2005 | Perkowski | ........ | G06F 17/30879 705/14.34 |
| 6,961,713 | B2 * | 11/2005 | Perkowski | ............. | G07F 17/16 705/26.62 |
| 6,993,494 | B1 * | 1/2006 | Boushy | ................ | G06Q 20/387 705/14.1 |
| 7,063,263 | B2 * | 6/2006 | Swartz et al. | ........... | 235/472.02 |
| 7,089,199 | B2 * | 8/2006 | Perkowski | ........ | G06F 17/30879 705/26.81 |
| 7,143,055 | B1 * | 11/2006 | Perkowski | ............. | G06Q 10/08 705/14.34 |
| 7,195,157 | B2 * | 3/2007 | Swartz et al. | ................ | 235/383 |

(Continued)

OTHER PUBLICATIONS

Kim LaChance Shandrow, This Slick iBeacon Device Helps Retailers Push Deals to In-Store Shoppers, Entrepeneur Magazine, https://www.entrepreneur.com/article/234119, May 22, 2014.*
Alan Henry, How Retail Stores Track You Using Your Smartphone (and How to Stop It), http://lifehacker.com/how-retail-stores-track-you-using-your-smartphone-and-827512308, Jul. 19, 2013.*
Stephanie Clifford and Quentin Hardy, Attention, Shoppers: Store Is Tracking Your Cell, The New York Times, http://www.nytimes.com/2013/07/15/business/attention-shopper-stores-are-tracking-your-cell.html?pagewanted=all&_r=1, Jul. 14, 2013.*
Daniel Tay, Brick-and-mortar store owners, this is what you're missing out on, https://www.techinasia.com/tapway-is-google-analytics-for-brick-and-mortar-store, Oct. 8, 2014.*

*Primary Examiner* — Jeffrey Zimmerman
(74) *Attorney, Agent, or Firm* — Sutherland Asbill & Brennan LLP (57) ABSTRACT

Systems and methods for controlling online shopping within a physical store or retailer location are provided. A wireless network connection may be provided to a consumer device at a retailer location on behalf of a retailer, and content requested by the consumer device via the wireless network connection may be identified. Based upon an evaluation of the identified content, a determination may be made that the consumer device is attempting to access information associated with a competitor of the retailer or an item offered for sale by the retailer. At least one control action may then be directed based upon the determination.

30 Claims, 4 Drawing Sheets

(56) References Cited

U.S. PATENT DOCUMENTS

| | | | | |
|---|---|---|---|---|
| 7,430,528 B2* | 9/2008 | Perkowski | | G06F 17/30879 |
| | | | | 705/27.2 |
| 7,441,710 B2* | 10/2008 | Perkowski | | G07F 17/16 |
| | | | | 235/462.01 |
| 7,516,094 B2* | 4/2009 | Perkowski | | G06F 17/30879 |
| | | | | 705/14.73 |
| 7,520,430 B1* | 4/2009 | Stewart | | G06Q 20/10 |
| | | | | 235/383 |
| 7,533,040 B2* | 5/2009 | Perkowski | | G06F 17/30879 |
| | | | | 705/26.4 |
| 7,536,324 B2* | 5/2009 | Perkowski | | G06Q 30/02 |
| | | | | 705/26.61 |
| 7,653,576 B2* | 1/2010 | Boss | | G06Q 30/02 |
| | | | | 705/26.1 |
| 7,653,687 B2* | 1/2010 | Reisman | | G06F 8/65 |
| | | | | 709/203 |
| 7,658,327 B2* | 2/2010 | Tuchman | | G06Q 30/02 |
| | | | | 235/375 |
| 7,711,598 B2* | 5/2010 | Perkowski | | G06F 17/30879 |
| | | | | 705/14.4 |
| 7,848,948 B2* | 12/2010 | Perkowski | | G06Q 30/02 |
| | | | | 705/14.4 |
| 7,904,333 B1* | 3/2011 | Perkowski | | G06F 17/30879 |
| | | | | 705/14.4 |
| 8,050,976 B2* | 11/2011 | Staib | | G06Q 20/201 |
| | | | | 705/14.23 |
| 8,065,201 B2* | 11/2011 | Perkowski | | G06F 17/30879 |
| | | | | 705/27.1 |
| 8,069,204 B2* | 11/2011 | Reisman | | G06F 8/65 |
| | | | | 709/203 |
| 8,112,435 B2* | 2/2012 | Epstein | | G06Q 30/0256 |
| | | | | 707/706 |
| 8,131,883 B1* | 3/2012 | Reisman | | G06F 8/65 |
| | | | | 705/16 |
| 8,458,055 B2* | 6/2013 | Perkowski | | G06F 17/30879 |
| | | | | 705/27.1 |
| 8,688,557 B2* | 4/2014 | Rose | | G06Q 40/00 |
| | | | | 705/36 R |
| 2002/0004753 A1* | 1/2002 | Perkowski | | G06Q 30/02 |
| | | | | 705/26.62 |
| 2002/0128859 A1* | 9/2002 | Perkowski | | G06F 17/30876 |
| | | | | 705/26.1 |
| 2002/0169687 A1* | 11/2002 | Perkowski | | G06Q 10/087 |
| | | | | 705/26.62 |
| 2002/0194081 A1* | 12/2002 | Perkowski | | G06F 17/30879 |
| | | | | 705/26.1 |
| 2002/0198791 A1* | 12/2002 | Perkowski | | G06F 17/30879 |
| | | | | 705/14.41 |
| 2003/0009392 A1* | 1/2003 | Perkowski | | G06F 17/30879 |
| | | | | 705/14.51 |
| 2003/0132298 A1* | 7/2003 | Swartz et al. | | 235/472.02 |
| 2003/0139975 A1* | 7/2003 | Perkowski | | G06F 17/30879 |
| | | | | 705/14.73 |
| 2003/0149642 A1* | 8/2003 | Perkowski | | G07F 17/16 |
| | | | | 705/26.1 |
| 2003/0158792 A1* | 8/2003 | Perkowski | | G06Q 30/02 |
| | | | | 705/26.62 |
| 2003/0200152 A1* | 10/2003 | Divekar | | G06Q 30/06 |
| | | | | 705/26.64 |
| 2004/0019535 A1* | 1/2004 | Perkowski | | G06F 17/30879 |
| | | | | 705/26.81 |
| 2004/0153378 A1* | 8/2004 | Perkowski | | G06F 17/30879 |
| | | | | 705/27.2 |
| 2004/0210479 A1* | 10/2004 | Perkowski | | G06Q 30/02 |
| | | | | 705/14.51 |
| 2004/0267610 A1* | 12/2004 | Gossett | | G06Q 30/02 |
| | | | | 705/14.16 |
| 2005/0004838 A1* | 1/2005 | Perkowski | | G06Q 30/02 |
| | | | | 705/14.73 |
| 2005/0010475 A1* | 1/2005 | Perkowski | | G06Q 30/02 |
| | | | | 705/14.51 |
| 2005/0040230 A1* | 2/2005 | Swartz et al. | | 235/383 |
| 2005/0050023 A1* | 3/2005 | Gosse | | G06F 17/30864 |
| 2005/0251456 A1* | 11/2005 | Perkowski | | G06Q 30/02 |
| | | | | 705/26.62 |
| 2006/0011716 A1* | 1/2006 | Perkowski | | G06Q 30/0623 |
| | | | | 235/375 |
| 2006/0069782 A1* | 3/2006 | Manning | | H04L 29/06 |
| | | | | 709/227 |
| 2006/0136372 A1* | 6/2006 | Schunemann | | G06Q 30/02 |
| 2006/0212361 A1* | 9/2006 | Perkowski | | G06F 17/30879 |
| | | | | 705/26.62 |
| 2006/0219780 A1* | 10/2006 | Swartz et al. | | 235/383 |
| 2006/0230064 A1* | 10/2006 | Perkowski | | G06Q 10/087 |
| 2007/0073845 A1* | 3/2007 | Reisman | | G06F 8/65 |
| | | | | 709/219 |
| 2007/0094418 A1* | 4/2007 | Reisman | | G06F 8/65 |
| | | | | 710/1 |
| 2007/0130090 A1* | 6/2007 | Staib | | G06Q 20/201 |
| | | | | 705/400 |
| 2007/0130400 A1* | 6/2007 | Reisman | | G06F 8/65 |
| | | | | 710/62 |
| 2007/0136136 A1* | 6/2007 | Nossik | | G06Q 30/02 |
| | | | | 705/14.66 |
| 2007/0138268 A1* | 6/2007 | Tuchman | | G06Q 30/02 |
| | | | | 235/383 |
| 2007/0192184 A1* | 8/2007 | Cai | | G06Q 10/06 |
| | | | | 705/14.6 |
| 2007/0210155 A1* | 9/2007 | Swartz et al. | | 235/383 |
| 2007/0220106 A1* | 9/2007 | Reisman | | G06F 8/65 |
| | | | | 709/217 |
| 2007/0220107 A1* | 9/2007 | Reisman | | G06F 8/65 |
| | | | | 709/217 |
| 2008/0033831 A1* | 2/2008 | Boss | | G06Q 30/02 |
| | | | | 705/26.62 |
| 2008/0235106 A1* | 9/2008 | Reisman | | G06F 8/65 |
| | | | | 705/64 |
| 2008/0270237 A1* | 10/2008 | Epstein | | G06Q 30/0256 |
| | | | | 705/14.54 |
| 2009/0063491 A1* | 3/2009 | Barclay | | G06Q 30/02 |
| 2009/0144159 A1* | 6/2009 | Bashyam | | G06Q 30/0257 |
| | | | | 705/14.55 |
| 2009/0144398 A1* | 6/2009 | Reisman | | G06F 8/65 |
| | | | | 709/219 |
| 2009/0292605 A1* | 11/2009 | Kniaz | | G06Q 30/00 |
| | | | | 705/14.25 |
| 2010/0063891 A1* | 3/2010 | Townsend | | G06Q 30/0222 |
| | | | | 705/26.1 |
| 2010/0082455 A1* | 4/2010 | Rosenblatt | | G06Q 30/02 |
| | | | | 705/26.1 |
| 2010/0107093 A1* | 4/2010 | Perkowski | | G06F 17/30879 |
| | | | | 715/763 |
| 2010/0262449 A1* | 10/2010 | Monteforte | | G06Q 30/02 |
| | | | | 705/7.34 |
| 2010/0287155 A1* | 11/2010 | Reisman | | G06F 8/65 |
| | | | | 707/709 |
| 2011/0016013 A1* | 1/2011 | Reisman | | G06F 8/65 |
| | | | | 705/26.1 |
| 2011/0202413 A1* | 8/2011 | Stewart | | G06Q 20/10 |
| | | | | 705/16 |
| 2011/0213655 A1* | 9/2011 | Henkin | | G06Q 30/00 |
| | | | | 705/14.49 |
| 2011/0238533 A1* | 9/2011 | Shadchnev | | G06Q 30/02 |
| | | | | 705/27.1 |
| 2012/0046998 A1* | 2/2012 | Staib | | G06Q 20/201 |
| | | | | 705/7.35 |
| 2012/0226558 A1* | 9/2012 | Robyor | | G06Q 30/0241 |
| | | | | 705/14.66 |
| 2012/0233001 A1* | 9/2012 | Perkowski | | G06F 17/30879 |
| | | | | 705/14.73 |
| 2013/0041752 A1* | 2/2013 | Crum | | G06Q 30/02 |
| | | | | 705/14.57 |
| 2013/0124360 A1* | 5/2013 | Mitrovic | | G06Q 30/0611 |
| | | | | 705/26.4 |
| 2013/0185150 A1* | 7/2013 | Crum | | G06Q 30/02 |
| | | | | 705/14.49 |

* cited by examiner

PHYSICAL STORE ONLINE SHOPPING CONTROL

BACKGROUND

A wide variety of retailers maintain physical store locations that offer items for point of sale purchase. Consumers are able to browse items within a physical store and personally evaluate the items. A consumer may also be able to obtain item information and recommendations from sales representatives at the physical store. However, with the widespread proliferation of electronic commerce, a consumer is also able to purchase many of the same items from retailers that maintain an online presence. Accordingly, a negative scenario may exist for a physical store retailer when a consumer evaluates items at the physical store, leverages physical store sales representatives, and then reviews pricing information online in order to purchase the same item from an online retailer. The physical store retailer pays for floor space, sales representative time, product inventory management, and other costs while not being able to complete a sales transaction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to the control of online or Internet shopping performed at a physical store or retailer location. Wireless Internet or other network access may be provided on behalf of a retailer at the retailer location. For example, one or more wireless access points may be provided at the retailer location (e.g., distributed throughout the retailer location, etc.). These wireless access points may be provided by a retailer or by a service provider on behalf of the retailer. Consumer devices, such as mobile devices and/or tablet computers, may be provided with network access, such as Wireless Fidelity (Wi-Fi) access, via the one or more wireless access points.

Once wireless access has been provided to a consumer device, requested network content may be identified and evaluated. For example, requested uniform resource locators (URLs) or Web pages, entered search terms, and/or other content requested by the consumer device (e.g., content requested by a dedicated application executed by the consumer device, etc.) may be identified and evaluated. In certain embodiments, a retailer computer or retailer system may identify and evaluate requested content. In other embodiments, a service provider of the retailer may identify and/or evaluate the requested content. For example, network requests may be routed through a service provider system. As another example, requested content may be identified and forwarded to a service provider for evaluation. In yet other embodiments, a service provider may provide the wireless access points on behalf of the retailer, and one or more service provider devices may identify and/or evaluate requested content.

During an evaluation of requested content, a determination may be made as to whether the requested content is associated with or potentially associated with a competitor of the retailer, an item offered for consumption (e.g., purchase, sale, etc.) by the retailer, or other information of interest to the retailer. For example, a requested URL may be compared to URL information associated with one or more competitors of the retailer in order to determine whether the consumer is attempting to access a competitor Web site or a non-retailer Web site containing information associated with an item offered by the retailer. As another example, one or more entered search terms may be evaluated in order to determine whether the consumer is attempting to search for an item (e.g., a product, a service, etc.) offered for sale by the retailer. Indeed, a wide variety of different evaluations may be performed. In the event that requested content is determined to be associated with or potentially associated with a competitor or an item of interest, one or more control actions may be directed on behalf of the retailer. In this regard, online shopping control may be provided on behalf of the retailer.

A wide variety of different types of control actions may be directed as desired in various embodiments. For example, access to competitor (or other requested) information may be blocked. As another example, the consumer device (or an associated browser or other application) may be redirected to other content, such as a retailer Web site. In certain embodiments, a desired item may be identified and counter-competitive information (e.g., price comparison information, a coupon, an offer to match a competitor price, information associated with complementary products, etc.) may be provided to the consumer device. As another example control action, proxy access may be provided to a Web site, such as a requested Web site of a competitor or a Web site associated with another retailer (e.g., an online retailer having a referral payment arrangement with the physical store retailer, etc.). As yet another example control action, a sales representative may be directed to assist the consumer. As yet another example control action, an out of band message (e.g., a short message service (SMS) message, an email message, a push notification associated with a retailer application on the consumer device, etc.) may be communicated to the consumer device. Other control actions may be directed, and the control actions described above are provided by way of example only. Additionally, a wide variety of other information may be taken into consideration during the determination of a control action, such as a location of the consumer within the retailer location, a consumer value to the retailer, and/or price comparison information between the retailer and a competitive offering of an item.

Certain embodiments will now be described more fully hereinafter with reference to the accompanying drawings, in which various embodiments and/or aspects are shown. However, various aspects may be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

Figure 1:
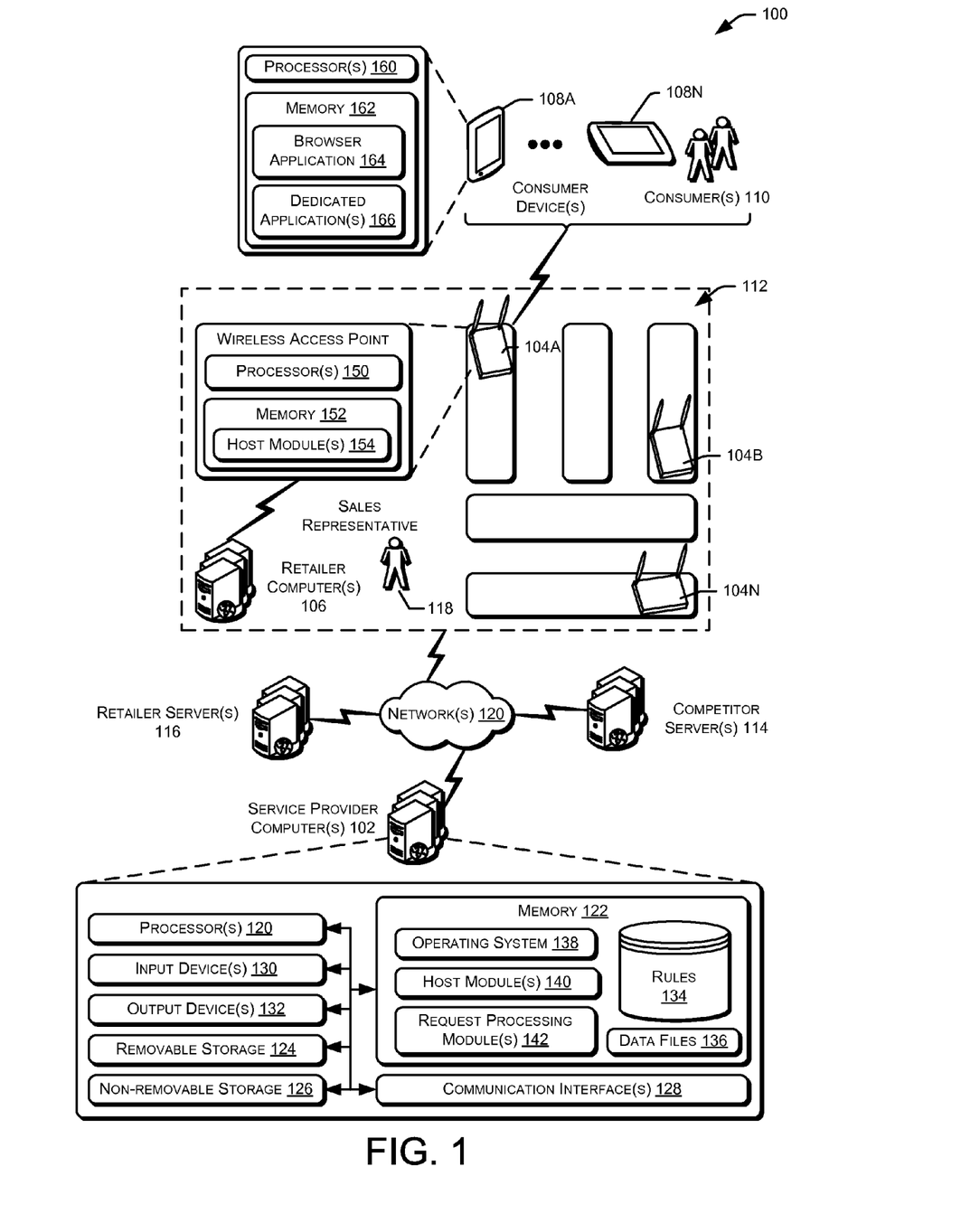
FIG. 1 illustrates a block diagram of an example system or architecture for providing physical store or retailer location online shopping control.

FIG. 1 illustrates a block diagram of an example system 100 or architecture for providing physical store or retailer location online shopping control. As shown in FIG. 1, the system 100 may include any number of service provider computers 102, wireless access points 104A-N, and/or retailer computers 106. Any number of consumer devices 108A-N may be associated with consumers 110, and the consumer devices 108A-N may be provided with Internet or other network access via one or more of the wireless access points 104A-N. In one aspect, the consumer devices 108A-N may be provided with network access at a retailer location 112, such as within a physical store associated with a retailer. Content requested by a consumer device (generally referred to as consumer device 108) may be identified and evaluated in order to determine whether the consumer 110 is attempting to access information associated with a competitor and/or an item offered for consumption by the retailer. For example, requested content may be evaluated by a retailer computer 106 (e.g., a retailer computer at the retailer location 112, a remote retailer computer, etc.) or by a service provider computer 102 (e.g., a service provider computer at the retailer location 112, a remote service provider computer, etc.).

A wide variety of different types of requested content may be identified and evaluated as desired in various embodiments. Based at least in part upon the evaluation, a determination may be made that the consumer device 108 is attempting to access information associated with a competitor of the retailer and/or an item offered for consumption by the retailer. For example, a URL associated with a competitor site or a competitive product offering, such as a site hosted by a competitor server 114 or by another entity on behalf of a competitor, may be identified. As explained in greater detail below, a wide variety of control actions may be directed if it is determined that the consumer device 108 is attempting to access competitor information or certain item information. For example, the consumer device 108 may be redirected to a retailer server 116 that hosts content on behalf of the retailer. As another example, a proxy connection may be facilitated between the consumer device 108 and a retailer server associated with another retailer or, in some embodiments, with a competitor server 114. As yet another example, a sales representative 118 at the retailer location 112 may be directed to assist the consumer 110 associated with the consumer device 108.

Additionally, any number of suitable networks 120, including both private and public networks, may facilitate communication between various components of the system 100. For example, certain components (e.g., the service provider computers 102, the retailer servers 116, the competitor servers 114, etc.) may communicate with the consumer devices 108A-N and/or retailer location devices via the Internet and/or other suitable wide area networks. Additionally, the wireless access points 104A-N may provide consumer devices 108A-N with access to the networks 120 on behalf of a retailer.

Each of the components illustrated in FIG. 1 will now be described in greater detail. Generally, network devices and systems, including one or more of the service provider computers 102, wireless access points 104A-N, retailer computers 106, consumer devices 108A-N, competitor servers 114, and/or retailer servers 116 may include or otherwise be associated with suitable hardware and/or software for transmitting and receiving data and/or computer-executable instructions over one or more communication links or networks. These network devices and systems may also include any number of processors for processing data and executing computer-executable instructions, as well as other internal and peripheral components that are well-known in the art. Further, these network devices and systems may include or be in communication with any number of suitable memory devices operable to store data and/or computer-executable instructions. By executing computer-executable instructions, each of the network devices may form a special-purpose computer or particular machine. As used herein, the term "computer-readable medium" describes any form of suitable memory or memory device for retaining information in any form, including various kinds of storage devices (e.g., magnetic, optical, static, etc.).

With reference to FIG. 1, any number of service provider computers 102 may be utilized as desired in various embodiments. The service provider computers 102 may include any number of suitable processor-driven devices that facilitate, for example, the identification of network content requested by a consumer device 108 (e.g., a requested URL, search terms, content requested by a dedicated application, etc.), the evaluation of the requested content, and/or the direction of one or more control actions if it is determined that the requested content is associated with a competitor of the retailer or otherwise satisfies one or more predetermined conditions. In some example embodiments, the service provider computers 102 may include one or more server computers, mainframe computers, networked computers, desktop computers, personal computers, laptop computers, mobile computers, and/or other processor-based devices. The service provider computers 102 may utilize one or more processors 121 to execute computer-readable or computer-executable instructions to facilitate the operations of the service provider computers 102. As a result of executing these computer-executable instructions, a special-purpose computer or particular machine may be formed that facilitates the evaluation of requested content as described herein.

An example service provider computer 102 will now be described. In addition to having one or more processors 121, the service provider computer 102 may further include one or more memory devices 122 (also referred to as memory 122), one or more communication interfaces 128, and/or one or more input devices 130 and output devices 132, as well as associated input/output (I/O) interfaces. The memory devices 122 may include any number of suitable memory devices, such as caches, read-only memory devices, random access memory devices, flash memory devices, magnetic storage devices, removable storage devices 124 (e.g., memory cards, etc.), and/or non-removable storage devices 126. As desired, the memory devices 122 may include internal memory devices and/or external memory devices in communication with the service provider computer 102. The memory devices 122 may store data, executable instructions, and/or various program modules utilized by the processors 121. Examples of data that may be stored by the memory devices 122 include data files 136 and/or any number of databases and/or other memory constructs, such as one or more rules databases 134, and/or any number of suitable program modules and/or applications that may be executed by the processors 121, such as an operating system (OS) 138, one or more host modules 140, and/or one or more request processing modules 142.

Stored data files 136 may include any suitable data that facilitates the operation of the service provider computer 102 and/or the interaction of the service provider computer 102 with one or more other components of the system 100. For example, the stored data files 136 may include, but are not limited to, information that facilitates communication with the wireless access points 104A-N, the retailer computers 106, the consumer devices 108A-N and/or other components of the system 100; information that facilitates the identification of requested content; information that facilitates the evaluation of requested content, information that facilitates the determination of a consumer location; information that facilitates the identification of a consumer 110; information that facilitates the determination of a consumer value; and/or information that facilitates the direction of one or more control actions. The rules databases 134, which may include any number of internal and/or external databases, may store a wide variety of information associated with the evaluation of requested content and/or the direction of control actions. Examples of suitable information that may be stored in the rules databases 134 include, but are not limited to, URL and/or other Web site information associated with competitor sites, item information, and/or other content of interest to the retailer, information associated with network servers associated with dedicated competitor (or other relevant entity) applications, information associated with items offered for sale by the retailer (e.g., item catalog information, inventory information, pricing information, etc.), consumer device information, consumer profile information, consumer account information (e.g., information associated with rewards accounts and/or other consumer accounts with the retailer, etc.), consumer value information, and/or information associated with historical purchases made by consumers. Additionally, as desired, one or more suitable database management systems (DBMS) may be utilized to facilitate the management of the information stored in the data files 136 and/or the rules databases 134.

The OS 138 may be a suitable module that facilitates the general operation of the service provider computer 102, as well as the execution of other program modules, such as the host modules 140, and/or the request processing modules 142. For example, the OS 138 may be, but is not limited to, Microsoft Windows®, Apple OSX™, Unix, a mainframe computer operating system (e.g., IBM z/OS, MVS, OS/390, etc.), or a specially designed operating system. The host modules 140 may include any number of suitable modules and/or applications configured to facilitate the establishment and management of various communications sessions with one or more other components of the system 100. For example, a host module 140 may include a suitable server component configured to host one or more Web pages or other graphical user interfaces accessible by the consumer devices 108A-N (e.g., Web pages accessible via network access provided by the wireless access points 104A-N). In this regard, the host module 140 may host a communications session for a consumer device 108. As another example, a host module 140 may host a communications session with a retailer computer 106, and the service provider computer 102 may receive information associated with requested content from a retailer computer 106.

The request processing modules 142 may include any number of suitable software modules and/or applications that facilitate the identification and/or evaluation of requested content, as well as the direction of one or more control actions. In operation, a request processing module 142 may identify content requested by a consumer device 108 via one or more wireless access points 104A-N. Alternatively, information associated with identified content may be received from a retailer computer 106 (or other component of the system 100). A wide variety of different types of requested content may be identified as desired. In certain embodiments, requested uniform resource locators (URLs) or Web pages may be identified. In other embodiments, search terms entered into a browser and/or provided to a Web page or other interface may be identified, such as search terms associated with an item to be purchased. In yet other embodiments, requests generated by a dedicated application (e.g., a dedicated application associated with a competitor) executed by a consumer device 108 may be identified.

Once requested content is identified, the requested content may be evaluated in order to determine whether the consumer device 108 is attempting (or potentially attempting) to access, for example, information associated with a competitor of the retailer or information associated with an item of interest to the retailer (e.g., information associated with a competitive offering of the item, etc.). For example, a determination may be made as to whether a consumer 110 is attempting to shop for an item or to find a lower price for an item while the consumer 110 is situated within a retailer location 112 or within a physical store. A wide variety of suitable techniques may be utilized to evaluate requested content and determine whether a consumer device 108 is attempting to access competitor information. For example, a requested URL or other network address information may be compared to URL information (e.g., stored URL information, etc.) associated with one or more competitors of the retailer (or other entities of interest to the retailer) in order to determine whether the consumer is attempting to access a competitor Web site or other Web site of interest. Similarly, requests generated by one or more dedicated applications (e.g., applications provided on behalf of competitors) may be evaluated in order to determine whether the consumer 110 is attempting to access a competitor service, such as a service hosted by a competitor server 114 or by a service provider on behalf of the competitor.

As another example, one or more search terms entered by a consumer (e.g., search terms entered into a search engine interface, etc.) may be identified and evaluated in order to determine whether the consumer is attempting to search for an item (e.g., a product, a service, etc.) offered for sale or other consumption by the retailer. In certain embodiments, Hypertext Transfer Protocol Secure (HTTPS) may be blocked, thereby forcing plaintext searching by a consumer device. Entered search terms may be compared to a wide variety of information, such as information associated with items offered by the retailer (e.g., electronic catalog information, inventory information, etc.) in order to determine whether the consumer 110 is searching for an item offered by the retailer or for an item similar to an item offered by the retailer. As one example, brand information, model type information, and/or item type information may be identified from search terms and evaluated. Utilizing an electronics store as an example retailer, a consumer 110 may enter search terms associated with a type of item (e.g., a camera, a flat screen television, etc.), a particular model (e.g., a model number, a particular video game, a movie, etc.), and/or a brand (e.g., manufacturer information, etc.). The entered search terms may be identified and compared to catalog information associated with the retailer in order to determine whether the consumer 110 is searching for an item that a competitor of the retailer may offer. Additionally, in certain embodiments, competitor information associated with an item (e.g., pricing information, shipping information, etc.) may be obtained or collected (e.g., obtained from a competitor Web site, etc.).

In the event that requested content is determined to be associated with or potentially associated with a competitor or item of interest, the request processing modules 142 may direct one or more control actions on behalf of the retailer. A wide variety of different types of control actions may be directed as desired in various embodiments. As one example control action, access to requested information (e.g. a URL or Web site, a network hosted service, etc.) may be blocked. As desired, a message may be communicated to the consumer device 108 in order to indicate that access has been blocked or that access is not permitted via a retailer network.

As another example control action, the consumer device 108 (or an associated browser application or other application) may be redirected to non-requested content. In certain embodiments, the consumer device 108 may be redirected to a Web site associated with the retailer. In this regard, online shopping performed by the consumer 110 may be limited to one or more Web sites or interfaces selected by or on behalf of the retailer. In other embodiments, search terms may be evaluated in order to generate a search results page that includes information associated with (or selected by or on behalf of) the retailer. As desired, the search results page may be identified as being associated with the retailer in order to limit or reduce consumer confusion.

As another example control action, proxy access may be provided by the request processing module 142 (or a host module 140) to a Web site or other network interface, such as a requested Web site of the competitor (e.g., a requested URL) or a Web site associated with another retailer (e.g., an online retailer having a referral payment arrangement with the physical store retailer, etc.). As a result of providing proxy access, the retailer may obtain a referral fee in the event that the consumer purchases an item from the Web site. Accordingly, even if online shopping results in a purchase, the retailer may be compensated. In certain embodiments, a proxy arrangement may attribute Web site visits to the retailer, as if the consumer were receiving advertisement impressions on a Web site of the retailer.

As another example control action, a sales representative 118 may be directed to assist the consumer. For example, a message may be communicated to a sales representative device (e.g., a mobile device, a personal computer, a tablet computer, etc.), and the message may include an instruction to assist the consumer 110 and, in certain embodiments, identified information associated with the consumer (e.g., a name of the consumer, consumer account information with the retailer, a desired item, competitor pricing information, special offer information, a location of the consumer, etc.). As yet another example control action, an out of band message (e.g., a short message service (SMS) message, an email message, a push notification associated with a retailer application on the consumer device, etc.) may be communicated to the consumer device. Other control actions may be directed, and the control actions described above are provided by way of example only.

Additionally, a wide variety of other information may be determined and taken into consideration during the determination of a control action. For example, identification information for the consumer 110 or the consumer device 108 may be determined based at least in part upon communications between the consumer device 108 and one or more wireless access points 104A-N. In certain embodiments, a consumer 110 may be prompted to enter identification information, such as a consumer account number with the retailer (e.g., a rewards account number, etc.), a telephone number, and/or an email address. In other embodiments, a cookie or other stored information associated with a consumer device 108 may provide identification information during the establishment (and/or maintenance) of a network session. In yet other embodiments, a database or other repository of physical consumer device identifiers (e.g., media access control (MAC) addresses, etc.) and corresponding consumer information (e.g., telephone numbers, email addresses, profile information, etc.) may be maintained and dynamically updated as consumer information is obtained. During the establishment (and/or maintenance) of a network session, a consumer device identifier may be determined and utilized to access stored information associated with the consumer.

As desired, the identification information may be utilized for a wide variety of different purposes, such as accessing stored information associated with the consumer 110 (e.g., consumer profile information, historical purchase history information, consumer value information, etc.) and/or communicating out of band messages to the consumer device 108. Additionally, in certain embodiments, consumer behavior (e.g., requested content, etc.) may be tracked over time and utilized to identify items (or types of items) desired by the consumer 110. Historical behavior may also be utilized to determine an appropriate control action. For example, if a consumer 110 at an outdoor retailer requests content for a wide variety of ski equipment, then a salesperson may be notified of the consumer's interests, and one or more special offers for the consumer 110 may be determined.

In certain embodiments, a location of the consumer 110 or consumer device 108 within the retailer location 112 may also be determined. For example, communications between the consumer device 108 and multiple wireless access points 104A-N may be utilized to triangulate a location or position of the consumer device 108 within the retailer location 112. The location information may be utilized for a wide variety of different purposes as desired in various embodiments. For example, location information may be provided to a sales representative 118 who is directed to assist the consumer 110. As another example, location information may be evaluated in order to determine an item or type of item in proximity to the consumer 110. In this regard, targeted offers and/or information may be provided to the consumer device 108 and/or a sales representative 118.

In certain embodiments, requested content may also be evaluated in order to identify an item (or type of item) that the consumer 110 is interested in purchasing or evaluating on a competitor Web site. For example, a requested URL associated with a particular item (or type of item) may be evaluated in order to identify a desired item. As another example, search terms may be evaluated in order to identify a desired item. As yet another example, as set forth above, a consumer location may be evaluated in order to identify a desired item. Once a desired item (or type of item) is identified, a wide variety of competitor and/or retailer information associated with the item (or a multitude of items satisfying an item type) may be accessed from memory, extracted from competitor Web sites, extracted from electronic catalog information, and/or otherwise obtained. For example, pricing information, availability information (e.g., information associated with whether an item is in stock at a competitor and/or at one or more retailer locations, etc.), shipping information, item bundling information, information associated with available discounts, information associated with special offers, and/or other information may be identified and/or determined. At least a portion of the item-related information may be evaluated in order to determine an appropriate control action.

In certain embodiments, item-related information may be utilized by the request processing modules 142 to generate counter-competitive information to be presented to the consumer 110. As desired, the counter-competitive information may include a wide variety of suitable data, such as a price comparison between the retailer and one or more competitors, a coupon (e.g., an electronic coupon, a quick response code, etc.) for the retailer, a special offer, an offer to match a competitor price, location information for an item (e.g., an aisle number for the item, etc.), an indication that the item is in stock, etc. As desired, a consumer value (e.g., a value determined from historical purchase information, a value determined from a type of loyalty rewards that the consumer has with the retailer, etc.) may be taken into consideration during the generation of counter-competitive information. For example, a special offer may be offered to a relatively high value consumer in an attempt to enhance consumer loyalty. Once generated, the counter-competitive information may be communicated to the consumer device 108. In certain embodiments, counter-competitive information may be presented to the consumer 110 via a retailer Web site following a redirection. In other embodiments, counter-competitive information may be provided to the consumer device 108 via one or more out of band messages.

Additionally, in certain embodiments, a price comparison may be performed for a desired item. For example, a competitor price for the item may be compared to a retailer price (e.g., a listed price, a discounted price, etc.). In this regard, a determination may be made as to whether the retailer should compete with a competitor. For example, differences in pricing information may be evaluated in light of cost information and/or customer value information in order to determine whether a counter-competitive offer should be made. In certain embodiments, a determination may be made that the retailer will not attempt to compete with a competitor. However, other information may be provided to the consumer 110 in certain embodiments. For example, information associated with complementary products may be generated and communicated to the consumer device 108. As one example, if the consumer 110 is searching for a particular television online, a determination may be made that the retailer cannot compete with a competitor price for the television. However, information associated with a television mounting bracket and/or connection cables may be communicated to the consumer device 108.

A wide variety of other control actions and/or associated evaluations may be utilized as desired in various embodiments. The operations described above are provided by way of example only. Additionally, any suitable combination of the control actions and/or associated evaluations may be performed. A few examples of the operations that may be performed by the request processing modules 142 are described in greater detail below with reference to FIGS. 3 and 4. Additionally, although the request processing modules 142 are described as providing a wide variety of functions, in certain embodiments, separate modules may perform specific functions. For example, a first module may facilitate identification of requested content, a second module may facilitate an evaluation of the requested content, and a third module may facilitate direction of a control action. Indeed, any number of processing modules and/or applications may be utilized as desired in various embodiments.

In certain embodiments, content downloaded by the consumer device 108 via a provided network session may also be evaluated by the service provider computer 102 (or another component of the system 100). For example, downloaded content may be evaluated utilizing any number of rules or techniques that facilitate the identification of the content and/or the identification of a type of content. In certain embodiments, a pattern of data that is being downloaded may be identified, and a type of content may be determined. For example, video content, certain graphical content, or other types of content may be identified. Additionally, in certain embodiments, information associated with the retailer (e.g., retailer identification information, retailer referral information, etc.) may be communicated to a publisher of the downloaded content. In this regard, in the event that referral fees or other hosting fees are available from the publisher, the retailer may collect these fees.

With continued reference to the service provider computer 102, the one or more input devices 130 and/or output devices 132 may facilitate user interaction with the service provider computer 102. Examples of suitable input and output devices 130, 132 include, but are not limited to, a display, a keypad, a mouse, a pointing device, a control panel, a touch screen display, a remote control, a microphone, a speaker, etc. As desired, one or more suitable input/output (I/O) interfaces may facilitate communication between the service provider computer 102 and the various I/O devices. The one or more communication interfaces 128 may facilitate connection of the service provider computer 102 to one or more suitable networks, for example, the networks 120 illustrated in FIG. 1. In this regard, the service provider computer 102 may receive and/or communicate information to other components of the system 100.

With continued reference to FIG. 1, any number of wireless access points 104A-N may be included. Each wireless access point (individually described as wireless access point 104) may include one or more devices (e.g., that facilitate connection of one or more consumer devices 108A-N to the Internet (or another suitable network). A wide variety of different types of wireless access points 104A-N may be utilized as desired in various embodiments, such as Wi-Fi access points, Bluetooth access points, cellular access points, and/or other suitable access points. Additionally, in certain embodiments, a multitude of access points may be distributed throughout a retailer location 112. In certain embodiments, the wireless access points 104A-N may be provided by the retailer. In other embodiments, the wireless access points 104A-N may be provided by a service provider on behalf of the retailer. As desired, each wireless access point 104 may be connected to one or more suitable routers or other devices that facilitate network communications.

A wireless access point 104 may include any number of suitable processor-driven devices that facilitate connection of consumer devices 108A-N to a network. In certain embodiments, the wireless access point 104 may utilize one or more processors 150 to execute computer-readable or computer-executable instructions to facilitate the operations of the wireless access point 104. As a result of executing these computer-executable instructions, a special-purpose computer or particular machine may be formed that facilitates the connection of consumer devices 108A-N to a network. Additionally, in certain embodiments, a special-purpose computer or particular machine may be formed that facilitates the collection of consumer and/or consumer device information, such as a MAC address, a telephone number, an email address, or a consumer account number with the retailer.

An example wireless access point 104 will now be described. In addition to having one or more processors 150, the wireless access point 104 may further include one or more memory devices 152 (also referred to as memory 152) and/or one or more communication interfaces (not shown). The memory devices 152 may include any number of suitable memory devices, such as caches, read-only memory devices, random access memory devices, flash memory devices, magnetic storage devices, removable storage devices (e.g., memory cards, etc.), and/or non-removable storage devices. The memory devices 152 may store data, executable instructions, and/or various program modules utilized by the processors 150. Examples of information that may be stored by the memory devices 152 include data files, as well as any number of suitable program modules and/or applications that may be executed by the processors 150, such as an operating system (not shown) and/or one or more host modules 154. The host modules 154 may include any number of suitable modules and/or applications configured to facilitate the establishment and management of communications sessions with one or more consumer devices 108A-N. For example, a host module 154 may facilitate connection of a consumer device 108 to the Internet or another network. As desired, a host module 154 may additionally facilitate the collection and/or identification of consumer and/or consumer device information.

With continued reference to FIG. 1, any number of retailer computers 106 may be included in certain embodiments. A retailer computer 106 may be a suitable processing device or combination of devices that facilitates the identification and/or evaluation of content requested by a consumer device 108. As desired, a retailer computer 106 may be situated at a retailer location 112 or, alternatively, a retailer computer 106 may be situated remotely from a retailer location 112. In certain embodiments, a retailer computer 106 may identify and evaluate content requested by a consumer device 108. In other embodiments, a retailer computer 106 may identify requested content and invoke a service provider computer 102 to evaluate the requested content. In yet other embodiments, a retailer computer 106 may be optional and/or not included. Indeed, a wide variety of different arrangements of retailer computers 106 and/or service provider computers 102 may be utilized as desired in various embodiments. As desired, a retailer computer 106 may include one or more processor-driven devices that include components similar to those described above for the service provider computers 102. For example, a retailer computer 106 may include one or more processors, memory devices, I/O interfaces, and/or network interfaces.

Additionally, any number of consumer devices 108A-N or user devices may be present. Examples of suitable consumer devices 108A-N include, but are not limited to, tablet computers, mobile devices (e.g., mobile phones, personal digital assistants, etc.), electronic reader devices, and/or any other suitable device capable of generating a request associated with network-based content. In operation, a consumer 110 may utilize a consumer device 108 at a retailer location 112 to request Internet and/or other network content. For example, the consumer 110 may utilize the consumer device 108 to browse the Internet, to execute an application, and/or for a wide variety of other purposes.

As desired, a consumer device 108 may be a processor-driven device that includes components similar to those described above for the service provider computers 102. For example, a consumer device 108 may include one or more processors 160, memory devices 162, I/O interfaces, and/or network interfaces. The memory devices 162 may be configured to store a wide variety of suitable computer-executable instructions, applications, and/or modules that may be utilized and/or executed by the processors 160. For example, the memory devices 162 may be configured to store any number of suitable applications that may request network content, such as a suitable browser application 164 and/or any number of dedicated applications 166 configured to request network content (e.g., a dedicated application associated with a competitor, a dedicated application associated with the retailer, etc.).

With continued reference to FIG. 1, any number of competitor servers 114 and/or retailer servers 116 may be included in certain embodiments. Each of the competitor servers 114 and/or retailer servers 116 may be a suitable processing device or combination of devices that facilitates the hosting of Web pages and/or other network content. For example, a competitor server 114 may host one or more competitor Web pages on behalf of a competitor. As another example, a retailer server 116 may host electronic commerce Web pages on behalf of the retailer associated with the retailer location 112 or on behalf of another retailer. As desired, a competitor server 114 or a retailer server 116 may include one or more processor-driven devices that include components similar to those described above for the service provider computers 102. For example, a competitor server 114 or a retailer server 116 may include one or more processors, memory devices, I/O interfaces, and/or network interfaces.

A wide variety of suitable networks 120 may be utilized in association with various embodiments. These networks 120 may include any telecommunication and/or data networks, whether public, private, or a combination thereof, including a wide area network, the Internet, intermediate handheld data transfer devices, a public-switched telephone network (PSTN), a cellular network, and/or any combination thereof and may be wired and/or wireless. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionalities described with respect to the system components shown in FIG. 1. Accordingly, embodiments and aspects should not be construed as being limited to any particular operating environment, system architecture, or device configuration.

Operational Overview

Figure 2A:
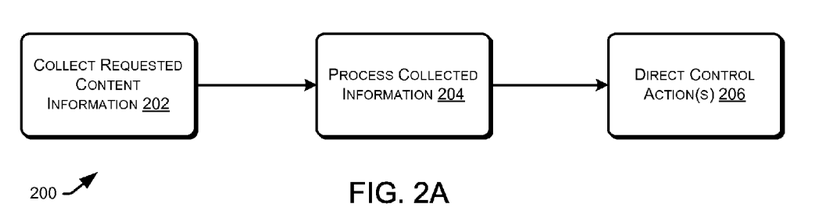
FIGS. 2A and 2B illustrate flow diagrams of example methods for evaluating network content information requested via network access provided on behalf of a retailer at a retailer location.
Figure 2B:
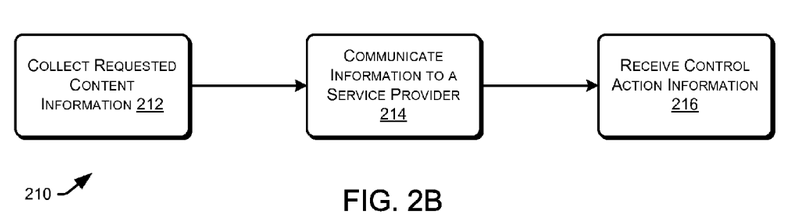

As set forth above, a wide variety of different operating environments may be utilized to identify and evaluate requested network content. Each of these operating environments may be associated with one or more suitable data flows and/or methods of operations. FIGS. 2A and 2B illustrate flow diagrams of example methods 200, 210 for evaluating network content information requested via network access provided on behalf of a retailer at a retailer location.

Turning first to FIG. 2A, a first example method 200 for evaluating requested network content information is illustrated. The method 200 may be performed by one or more suitable retailer computers associated with a retailer, such as the retailer computers 106 illustrated in FIG. 1. Once network access has been provided to a consumer device, requested content information (e.g., a requested URL, search terms, etc.) may be collected and/or identified at block 202. For example, the retailer computers 106 may receive and evaluate network requests that are communicated through a wireless access point in order to identify request content. At block 204, the collected or identified content request information may be processed or evaluated by the retailer computers 106 in order to determine whether a consumer is attempting to access information associated with a competitor of the retailer, an item offered for consumption by the retailer, or other information of interest. In the event that it is determined that the consumer is attempting to access information of interest to the retailer, operations may continue at block 206, and any number of control actions may be directed by the retailer computers 106. In embodiments in which attempts to access competitor information are identified, a competitor may be any other entity that offers items for purchase that correspond to items offered by the retailer. Additionally, an item may include a product, a service, a bundle of products, digital content, and/or another offering.

With respect to FIG. 2B, a second example method 210 for evaluating requested network content information is illustrated. The method 210 may be performed by one or more suitable service provider computers, such as the service provider computers 102 illustrated in FIG. 1. Requested content information (e.g., a requested URL, search terms, etc.) may be collected and/or identified at block 212. For example, the service provider computers 102 may receive content information from a retailer computer 106. As another example, the service provider computers 102 may intercept network requests and identify requested content information. At block 214, the collected or identified content request information may be processed or evaluated by the service provider computers 102 in order to determine whether a consumer is attempting to access information associated with a competitor of a retailer, certain item information, or other information of interest. In the event that it is determined that the consumer is attempting to access information of interest to the retailer, then operations may continue at block 216, and any number of control actions may be directed by the service provider computers 102.

Other operating environments, including other arrangements of retailer computers and/or service provider computers, as well as distributed operating environments may be utilized as desired in various embodiments. The operating environments and associated processing described above are provided by way of example only.

Figure 3:
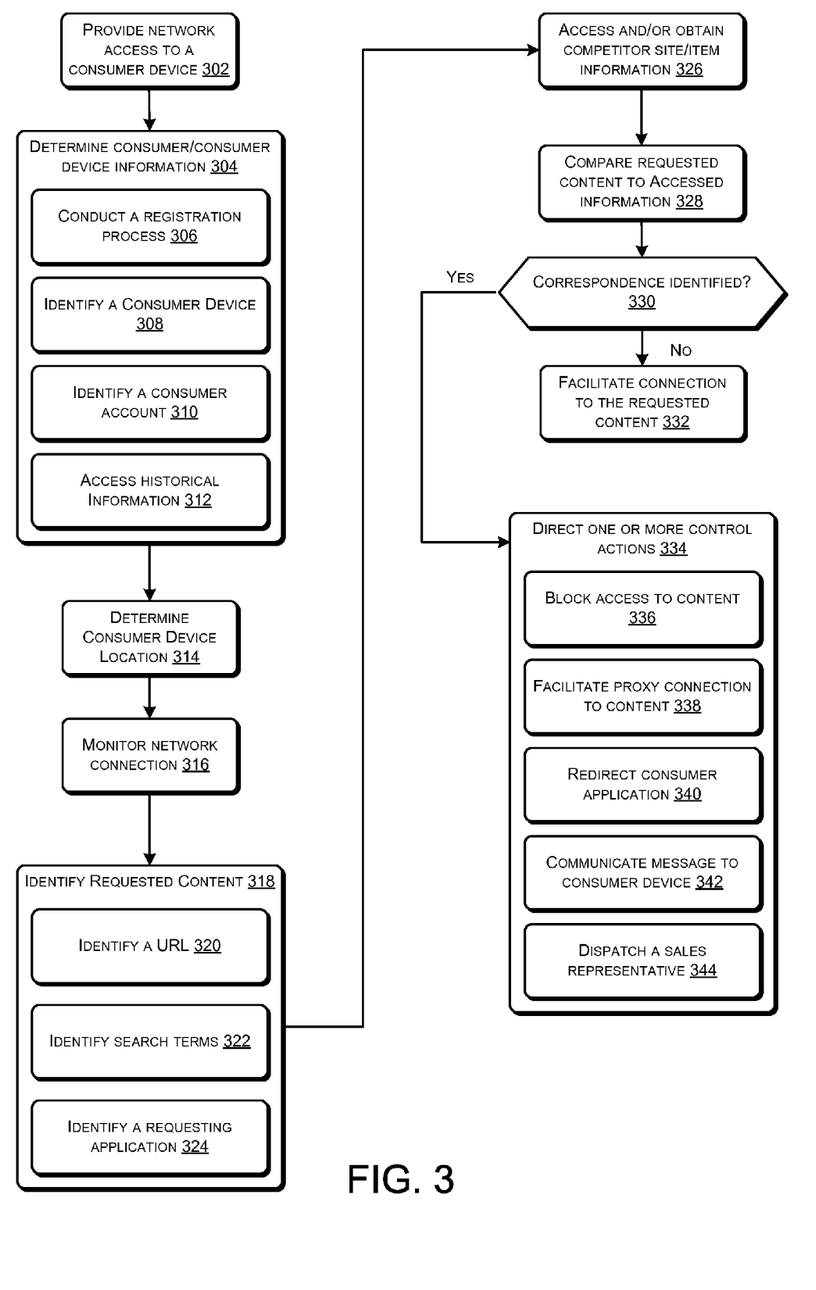
FIG. 3 illustrates a flow diagram of an example method for providing physical store or retailer location online shopping control.

FIG. 3 illustrates a flow diagram of an example method 300 for providing physical store or retailer location online shopping control. In certain embodiments, the operations of the method 300 may be performed by one or more suitable retailer computers and/or service provider computers, such as the retailer computers 106 and/or the service provider computers 102 illustrated in FIG. 1. The method 300 may begin at block 302.

At block 302, network access (e.g., Internet access, etc.) may be provided to a consumer device situated within a retailer location, such as one of the consumer devices 108A-N illustrated in FIG. 1. In certain embodiments, network access may be provided by one or more wireless access points operated by the retailer or by a service provider on behalf of the retailer. Additionally, a wide variety of different types of access points may be utilized to provide network access including, but not limited to, Wi-Fi access points, Bluetooth access points, and/or cellular access points.

At block 304, consumer and/or consumer device information may be identified or determined. A wide variety of suitable techniques may be utilized to identify consumer and/or consumer device information. For example, at block 306, a registration process may be performed prior to the consumer device 108 being permitted to access a network. During the registration process, a consumer 110 may be prompted to enter various information (e.g., a telephone number, an email address, consumer account information, etc.). Additionally, various terms and conditions associated with the provided network access may be presented to the consumer 110. As another example, at block 308, the consumer device 108 may be identified. For example, a MAC address or other physical address associated with the consumer device 108 may be identified. As another example, information included in a cookie may be received from the consumer device 108 and evaluated. As desired, consumer identification information (e.g., a telephone number, etc.) and/or consumer device information (e.g., a MAC address) may be utilized to access a wide variety of stored information. For example, at block 310, a consumer account with the retailer (e.g., a rewards account, a loyalty account, a credit account, etc.) may be identified from accessed information and/or from information received from the consumer device 108. As another example, at block 312, stored historical information associated with the consumer 110 (e.g., historical purchase information, etc.) and/or consumer profile information may be accessed or otherwise obtained. Indeed, a wide variety of different types of information may be identified or determined.

At block 314, a location of the consumer device 108 within the retailer location may be determined. For example, the location may be triangulated utilizing information received from a multitude of wireless access points. The determined location may be utilized for a wide variety of different purposes, such as identifying one or more items that interest the consumer 110 and/or directing a sales representative to assist the consumer 110.

At block 316, a network connection and/or communications session associated with the consumer device 108 may be monitored. As desired, the network connection may be monitored by a retailer or by a service provider on behalf of the retailer. In this regard, requested content and/or downloaded content may be identified and/or evaluated. At block 318, content requested by the consumer device 108 may be identified. A wide variety of different types of requested content may be identified as desired in various embodiments. For example, at block 320, a requested URL or other network address may be identified. As another example, at block 322, search terms entered by a consumer 110 may be identified. As yet another example, at block 324, a request generated by a dedicated application (e.g., a shopping application, an application associated with a competitor, etc.) may be identified.

At block 326, a wide variety of competitor Web site, network service, and/or item information may be accessed from memory and/or obtained from any number of suitable data sources. The identified requested content may then be compared to at least a portion of the accessed or obtained information at block 328. In this regard, a determination may be made at block 330 as to whether the requested content corresponds to competitor information, relevant item information, and/or other information of interest to the retailer. In other words, a determination may be made as to whether the consumer 110 is attempting to access, for example, competitor information or information associated with an item offered for consumption by the retailer. For example, a determination may be made as to whether the consumer 110 is attempting to access a URL associated with a competitor Web site. As another example, a determination may be made as to whether identified search terms correspond to one or more items offered by the retailer and/or a competitor. As yet another example, a determination may be made as to whether a requested network service is associated with a competitor.

If it is determined at block 330 that the consumer 110 is not attempting to access competitor information or other information of interest, then operations may continue at block 332, and access to the requested content may be permitted and/or facilitated. Otherwise, if it is determined at block 330 that the consumer 110 is attempting to access competitor information or other information of interest (e.g., relevant item information, etc.), then operations may continue at block 334. At block 334, one or more control actions may be directed and/or facilitated. A wide variety of different control actions may be directed as desired in various embodiments. For example, at block 336, access to requested content may be blocked. As another example, at block 338, a proxy connection to the requested content (or similar content associated with another retailer or competitor) may be facilitated. As another example, at block 340, a consumer application (e.g., a browser application, etc.) executed by the consumer device 108 may be redirected to other content, such as a Web page associated with the retailer. In this regard, counter-competitive information may be presented to the consumer 110. As yet another example control action, one or more out of band messages or other messages may be communicated to the consumer device 108 at block 342. As another example control action, a sales representative may be dispatched or directed to assist the consumer 110 at block 344. Other control actions will be appreciated in light of the present disclosure. Additionally, a few examples of directing control actions are described in greater detail below with reference to FIG. 4. The method 300 may end following block 334.

Figure 4:
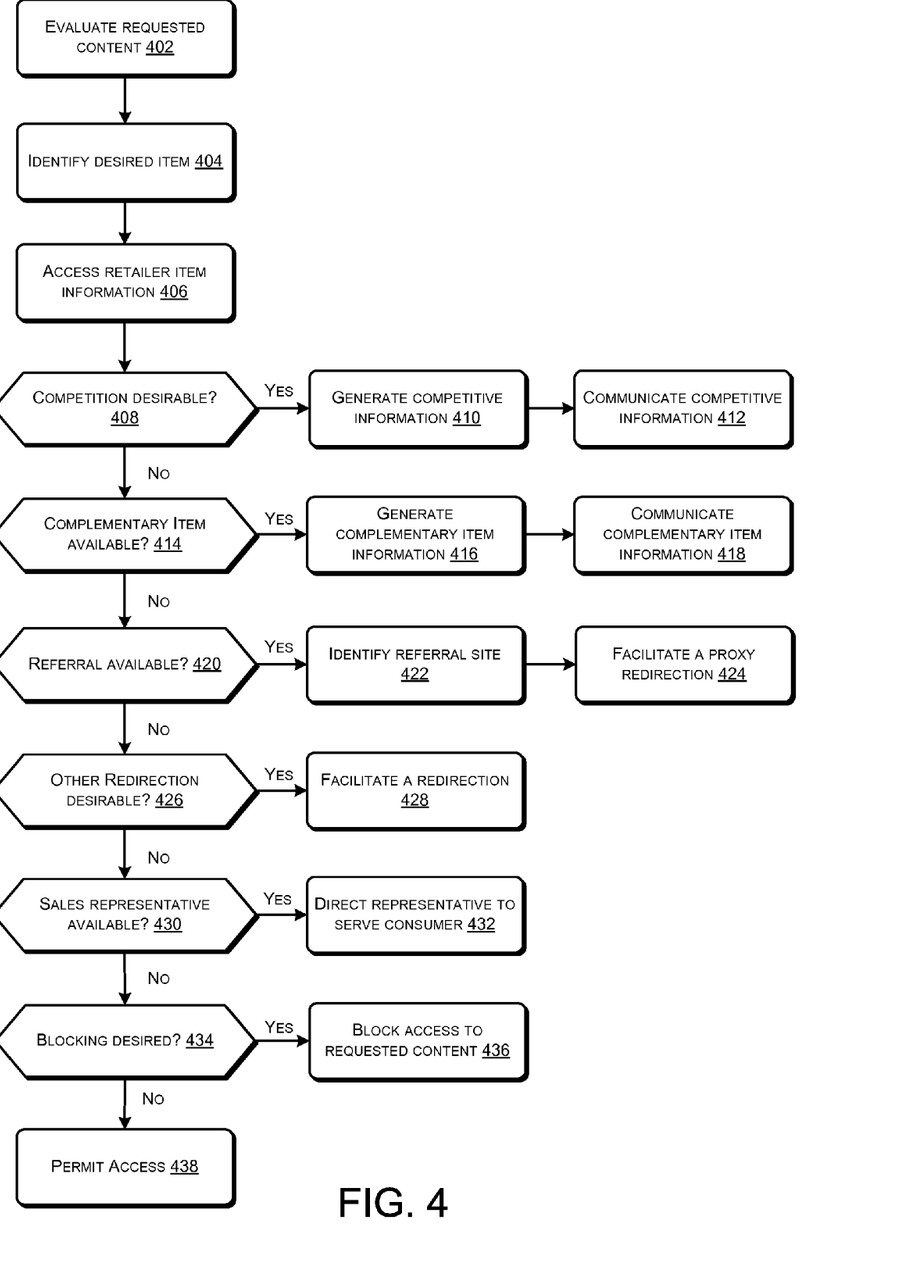
FIG. 4 illustrates a flow diagram of an example method for determining one or more control actions to be taken based upon an evaluation of requested network content.

FIG. 4 illustrates a flow diagram of an example method 400 for determining one or more control actions to be taken based upon an evaluation of requested network content. In certain embodiments, the operations of the method 400 may be performed by one or more suitable retailer computers and/or the service provider computers, such as the retailer computers 106 and/or service provider computers 102 illustrated in FIG. 1. The method 400 may begin at block 402.

At block 402, requested content (e.g., a requested URL, search terms, etc.) may be identified and/or evaluated. In this regard, a desired item may be identified at block 404. Additionally, a wide variety of competitor information associated with the item may be determined (e.g., accessed from memory, obtained from a competitor Web site, etc.), such as pricing information, availability information, shipping information, etc. At block 406, retailer information associated with the identified item (or similar items) may be accessed. For example, retailer pricing information, cost information, special offer information, available discount information, and/or item location information may be accessed or otherwise obtained.

At block 408, a determination may be made as to whether competition for the item is desirable. In other words, a determination may be made as to whether it is desirable for the retailer to compete with the competitor with respect to a desired item. For example, a determination may be made as to whether the retailer can compete with a price offered by a competitor. In certain embodiments, a consumer value may be taken into consideration when determining whether competition is desirable. If it is determined at block 408 that competition is not desirable, then operations may continue at block 414 described in greater detail below. Otherwise, if it is determined at block 408 that competition is desirable, then operations may continue at block 410. At block 410, counter-competitive information (e.g., price comparison information, a coupon, etc.) may be generated, and the counter-competitive information may be communicated to the consumer device 108 at block 412.

At block 414, which may be reached following a determination at block 408 that competition is not desirable, a determination may be made as to whether a complementary item associated with an identified desired item is available. If it is determined at block 414 that a complementary item is available, then operations may continue at block 416, and complementary item information (e.g., an offer for a complementary item, etc.) may be generated. The generated complementary item information may be communicated to the consumer device 108 at block 418. If, however, it is determined at block 414 that a complementary item is not available (or, in some embodiments, following the communication of complementary item information), then operations may continue at block 420.

At block 420, a determination may be made as to whether a referral is available. In other words, a determination may be made as to whether a referral fee may be obtained by the retailer from another entity, such as a competitor associated with requested content or a third-party retailer. If it is determined at block 420 that a referral is available, then a referral site may be identified at block 422. A proxy connection or a proxy redirection to the identified referral site may then be facilitated at block 424. If, however, it is determined at block 420 that a referral is not available, then operations may continue at block 426.

At block 426, a determination may be made as to whether another redirection is desirable. For example, a determination may be made as to whether the consumer device 108 should be redirected to a retailer Web site or to another site. If it is determined at block 426 that another redirection is desirable, then operations may continue at block 428, and the redirection may be facilitated. If, however, it is determined at block 426 that another redirection is not desirable, then operations may continue at block 430.

At block 430, which may be reached from block 426 (or from a wide variety of other blocks illustrated in the method 400), a determination may be made as to whether a sales representative is available for assisting the consumer 110 and/or whether sales representative assistance is desirable (e.g., desirable based upon an evaluation of consumer value, etc.). If it is determined at block 430 that a sales representative is available and/or desirable, then operations may continue at block 432, and a sales representative may be directed to assist or serve the consumer. As desired, consumer location information and/or a wide variety of other information (e.g., desired item information, special offer information, etc.) may be provided to the sales representative. If, however, it is determined at block 430 that a sales representative is not available or not desirable, then operations may continue at block 434.

At block 434, a determination may be made as to whether it is desirable to block the requested content (e.g., a URL of a competitor, etc.). If it is determined at block 434 that blocking is desirable, then operations may continue at block 436, and access to the requested content may be blocked or prevented. If, however, it is determined at block 434 that blocking is not desirable, then operations may continue at block 438, and access to the requested content may be permitted. Operations of the method 400 may end following any of blocks 412, 418, 424, 428, 432, 436, or 438. Additionally, the control actions and/or hierarchy of control actions described in FIG. 4 are provided by way of example only. Other control actions and/or hierarchies of various control actions may be utilized as desired.

The operations described and shown in the methods 200, 210, 300, 400 of FIGS. 2A, 2B, 3, and 4 may be carried out or performed in any suitable order as desired in various embodiments. Additionally, in certain embodiments, at least a portion of the operations may be carried out in parallel. Furthermore, in certain embodiments, less than or more than the operations described in FIGS. 2A, 2B, 3, and 4 may be performed.

Although the example embodiments described above are related to a retail environment, embodiments of the disclosure are equally applicable to a wide variety of other operating environments. For example, network access may be provided to consumer or user devices on behalf of a museum or other entity. Requested content may then be identified and evaluated on behalf of the entity to determine whether one or more predetermined conditions have been satisfied, and one or more control actions may be directed if the one or more conditions are satisfied. For example, a museum may wish to block access to museum tour information hosted by third-party providers or re-direct a user device to museum-affiliated or approved content.

As another example, network access may be provided on behalf of a municipality or other entity in a public park. Requested content may then be identified and evaluated in order to direct one or more control actions in the event that a user is attempting to access content that is not approved by the entity, such as content that may incite civil unrest. Additionally, downloaded content may be evaluated in order to identify referral opportunities that may increase revenue collected on behalf of the entity. Indeed, embodiments of the disclosure may be utilized in association with any number of different entities.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
    at least one wireless access point configured to provide Internet access to a consumer device within a retail establishment associated with a retailer, and
    at least one processing component configured to:
        identify a first uniform resource locater (URL) requested, via the wireless access point, by a browser application executing on the consumer device;
        determine, based upon a comparison of the first URL to stored information associated with one or more competitors of the retailer, that the first URL is associated with a competitor Web site;
        identify an offering of an item on the competitor Web site;

identify (i) retailer information associated with an offering of the item by the retailer and (ii) competitor information associated with the offering of the item on the competitor Web site, wherein the retailer information comprises a first price for the offering of the item by the retailer and the competitor information comprises a second price for the offering of the item on the competitor Web site;

determine that a difference between the first price and the second price exceeds a first threshold value or that a consumer value of a consumer associated with the consumer device does not exceed a second threshold value;

determine, responsive to determining that the difference between the first price and the second price exceeds the first threshold value or that the consumer value exceeds the second threshold value, that information associated with an offering of a complementary item that is complementary to the item should be presented to the consumer in lieu of counter-competitive information that competes with the offering of the item on the competitor Web site; and redirect the browser application to a second URL different from the first URL, wherein the second URL is associated with a Web site that includes the information associated with the offering of the complementary item.

2. The system of claim 1, wherein the at least one processing component is further configured to redirect the browser application to a third URL that provides proxy access to the competitor Web site on behalf of the retailer.

3. The system of claim 1, wherein the Web site associated with the second URL is associated with an online retailer other than a competitor associated with the competitor Web site.

4. A method, comprising:
under control of one or more computer systems configured with executable instructions,
identifying content associated with a first uniform resource locater (URL) requested by a browser application executing on a consumer device via a wireless network connection provided on behalf of a retailer at a retailer location;
determining, based upon an evaluation of content associated with the first URL, that the consumer device is attempting to access information associated with an item of interest to the retailer;
responsive to determining that the consumer device is attempting to access information associated with the item of interest, identifying i) retailer information associated with an offering of the item of interest by the retailer and ii) competitor information associated with a competitive offering of the item of interest by a competitor to the retailer, wherein the retailer information comprises a first price for the offering of the item of interest by the retailer and the competitor information comprises a second price for the competitive offering of the item of interest by the competitor;
determining that a difference between the first price and the second price exceeds a first threshold value or that a consumer value of a consumer associated with the consumer device does not exceed a second threshold value;
determining, based at least in part on determining that the difference between the first price and the second price exceeds the first threshold value or that the consumer value exceeds the second threshold value, that information associated with an offering of a complementary item that is complementary to the item of interest should be presented to the consumer in lieu of counter-competitive information that competes with the competitive offering; and redirect the browser application to a second URL different from the first URL, wherein the second URL is associated with a Web site that includes the information associated with the offering of the complementary item.

5. The method of claim 4, wherein determining that the consumer device is attempting to access the information associated with the item of interest to the retailer comprises determining that the first URL corresponds to stored URL information associated with one of (i) the competitor to the retailer or (ii) the item of interest.

6. The method of claim 4, wherein identifying the content comprises identifying one or more search terms associated with a requested search for the item of interest.

7. The method of claim 4, wherein the consumer is a first consumer, the consumer device is a first consumer device, the browser application is a first browser application, and the item of interest is a first item of interest, the method further comprising:
identifying second content associated with a request submitted by a second browser application executing on a second consumer device via the wireless network connection provided on behalf of the retailer at the retailer location;
determining, based upon an evaluation of second content, that the second consumer device is attempting to access information associated with a second item of interest to the retailer;
identifying i) retailer information associated with an offering of the second item of interest by the retailer and ii) competitor information associated with a competitive offering of the second item of interest by the competitor to the retailer, wherein the retailer information comprises a third price for the offering of the second item of interest by the retailer and the competitor information comprises a fourth price for the competitive offering of the second item of interest by the competitor;
determining that a difference between the third price and the fourth price does not exceed the first threshold value;
determining, based at least in part on determining that the difference between the third price and the fourth price does not exceed the first threshold value, counter-competitive information that competes with the competitive offering of the second item of interest; and
directing a control action.

8. The method of claim 7, wherein the counter-competitive information comprises at least one of (i) a comparison of the third price to the fourth price, (ii) a coupon, (iii) a special offer, (iv) a location of the second item of interest within the retail location, (v) availability information for the second item of interest, or (vi) an offer by the retailer to match the fourth price.

9. The method of claim 7, wherein the Web site is a first Web site, and wherein directing the control action comprises redirecting the second browser application to a third URL associated with a second Web site that includes the counter-competitive information, wherein the second Web site is associated with the retailer.

10. The method of claim 4, further comprising identifying the complementary item based at least in part on one or more characteristics associated with the item of interest.

11. The method of claim 4, further comprising identifying the consumer by:
accessing, utilizing identification information associated with the consumer device, stored consumer account information; and
identifying, based at least in part on the identification information associated with the consumer device, an account of the consumer with the retailer.

12. The method of claim 11, further comprising:
determining historical purchase information associated with one or more historical purchases made by the consumer; and
determining the consumer value based at least in part upon the historical purchase information.

13. The method of claim 4, wherein the Web site is a first Web site, the method further comprising redirecting the browser application to a third URL that provides proxy access to a second Web site associated with the competitor.

14. The method of claim 4, wherein the Web site is associated with an online retailer other than the competitor.

15. The method of claim 7, wherein directing the control action comprises directing a sales representative to present the counter-competitive information to the second consumer.

16. The method of claim 7, wherein directing the control action comprises directing communication of an out of band message comprising the counter-competitive information to the second consumer device.

17. The method of claim 16, wherein directing communication of an out of band message comprises directing communication of at least one of (i) a short message service message, (ii) an email message, or (iii) a push notification.

18. The method of claim 7, further comprising:
determining, based at least in part upon location information associated with one or more wireless access points that facilitate the wireless network connection, a location of the second consumer,
wherein directing the control action comprises directing the control action based at least in part upon the determined location.

19. The method of claim 4, further comprising:
evaluating content downloaded by the consumer device via the wireless network connection;
determining, based at least in part upon evaluating the downloaded content, that the downloaded content satisfies at least one predetermined condition; and
communicating, to a publisher of the downloaded content, identification information associated with the retailer to facilitate payment of a referral fee to the retailer.

20. A system, comprising:
at least one memory configured to store computer-executable instructions; and
at least one processor configured to access the at least one memory and execute the computer-executable instructions to:
identify a user device connected to a wide area network via a wireless connection provided on behalf of an entity proximate to the user device;
determine that content associated with a first uniform resource locater (URL) requested by a browser application executing on the user device via the wireless connection is of interest to the entity;
identify an item associated with the requested content responsive to a determination that the requested content is of interest to the entity;
identify: i) entity information associated with an offering of the item by the entity and ii) competitor information associated with a competitive offering of the item by a competitor to the entity, wherein the entity information comprises a first price for the offering of the item by the entity and the competitor information comprises a second price for the competitive offering of the item by the competitor;
determine that a difference between the first price and the second price exceeds a first threshold value or that a consumer value of a consumer associated with the user device does not exceed a second threshold value;
determine that information associated with an offering of a complementary item that is complementary to the item of interest should be presented to the consumer in lieu of counter-competitive information that competes with the competitive offering; and
redirect the browser application to a second URL different from the first URL, wherein the second URL is associated with a Web site that includes the information associated with the offering of the complementary item.

21. The system of claim 20, wherein the requested content comprises one of (i) Web site content associated with the first URL or (ii) one or more search terms.

22. The system of claim 20, wherein the Web site is a first Web site, and wherein the at least one processor is further configured to redirect the browser application to a third URL that provides proxy access to a second Web site associated with the competitor on behalf of the retailer.

23. The system of claim 20, wherein the Web site is associated with an online retailer other than the competitor and the entity.

24. The system of claim 20, wherein the consumer is a first consumer, the user device is a first user device, the browser application is a first browser application, the content is first content, and the item is a first item, the method further comprising:
identify a second user device connected to the wide area network via the wireless connection provided on behalf of the entity;
determine that second content requested by a second browser application executing on the second user device via the wireless connection is of interest to the entity;
identify a second item associated with the second content responsive to a determination that the second content is of interest to the entity;
identify i) entity information associated with an offering of the second item by the entity and ii) competitor information associated with a competitive offering of the second item by the competitor, wherein the retailer information comprises a third price for the offering of the second item by the entity and the competitor information comprises a fourth price for the competitive offering of the second item by the competitor,
determine that a difference between the third price and the fourth price does not exceed the first threshold value;
determine, based at least in part on determining that the difference between the third price and the fourth price does not exceed the first threshold value, counter-competitive information for competing with the competitive offering of the second item; and direct a control action.

25. The system of claim 24, wherein the counter-competitive information comprises at least one of (i) a comparison of the third price to the fourth price, (ii) a coupon, (iii) a special offer, (iv) a location of the second item within a retail location associated with the entity, (v) availability information for the second item, or (vi) an offer by the entity to match the fourth price.

26. The system of claim 24, wherein the Web site is a first Web site, and wherein directing the control action comprises redirecting the second browser application to a third URL associated with a second Web site that includes the counter-competitive information, wherein the second Web site is associated with the entity.

27. The system of claim 24, wherein directing the control action comprises directing a sales representative to present the counter-competitive information to the second consumer.

28. The system of claim 24, wherein directing the control action comprises directing communication of an out of band message comprising the counter-competitive information to the second consumer device.

29. The system of claim 28, wherein directing communication of an out of band message comprises directing communication of at least one of (i) a short message service message, (ii) an email message, or (iii) a push notification.

30. The system of claim 24, wherein the at least one processor is further configured to:

determine, based at least in part upon location information associated with one or more wireless access points that facilitate the wireless network connection, a location of the second consumer, wherein directing the control action comprises directing the control action based at least in part upon the determined location.

* * * * *